M. NEIL & W. YOUNG.
Plashed Fence.

No. 208,757. Patented Oct. 8, 1878.

Witnesses.
Harry King
Emanuel Blout

Inventor.
Michael Neil and
Wesley Young

UNITED STATES PATENT OFFICE.

MICHAEL NEIL, OF DAYTON, AND WESLEY YOUNG, OF COLUMBUS, OHIO.

IMPROVEMENT IN PLASHED FENCES.

Specification forming part of Letters Patent No. 208,757, dated October 8, 1878; application filed August 15, 1878.

*To all whom it may concern:*

Be it known that we, MICHAEL NEIL, of Dayton, in the county of Montgomery and State of Ohio, and WESLEY YOUNG, of Columbus, in the county of Franklin and State of Ohio, have invented a certain new and useful Improvement in Plashed Fences; and we do hereby declare the following to be a full and exact description of the same, reference being had to the accompanying drawings, forming a part of this specification, in which—

Figure 1:
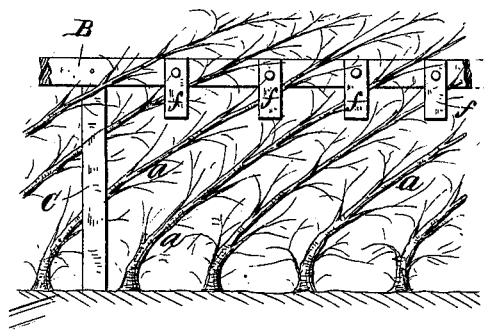
Figure 2:
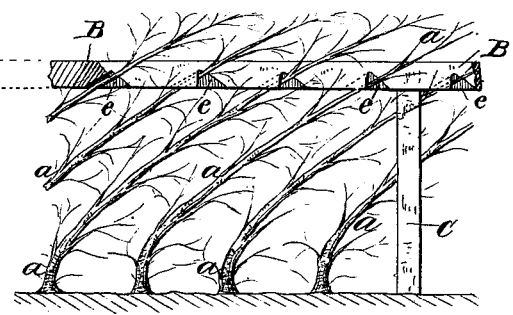
Figure 3:
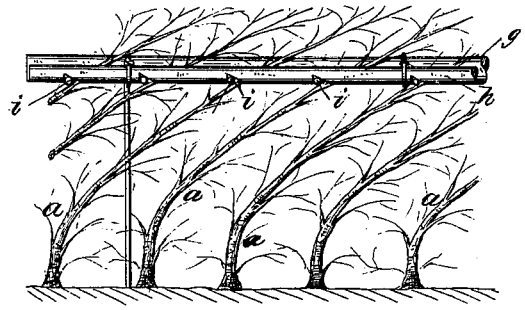
Figure 4:
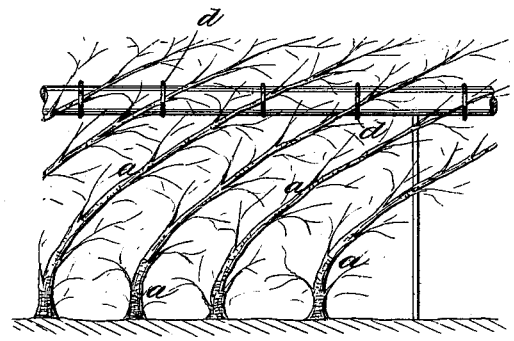
Figure 5:
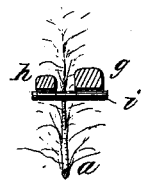

Figure 1 represents the principle of the invention. Fig. 2 is a modification of the plan shown in Fig. 1; and Figs. 3, 4, and 5 are views of other modifications.

Similar letters of reference in the several figures denote the same parts.

This invention is an improvement upon the old modes of plashing hedges; and it consists in bending down the canes in the vertical plane of the fence, so that they will stand in an inclined position approximately or quite parallel to each other, and securing them in such position by tying or otherwise fastening their upper portion to a horizontal bar supported at its ends upon stakes or posts.

In the drawings, $a\ a$ are the canes, and B is the bar, supported by posts or stakes C.

The canes may be fastened to the bar in a great variety of ways, of which four are shown in the drawings—viz., the mode of tying them to the bar by cords, wires, or other flexible fastenings $d$, or holding them by notches $e$ cut in the lower edge of the bar, or by pins or cleats $f$, attached to and projecting in any suitable direction from the bar, or by using two bars connected by pins, straps, &c., as at $g\ h\ i$, or by any equivalent mode of holding the canes separate from each other and in the proper position by means of the horizontal or substantially horizontal bar.

Having thus described our invention, we claim as new—

The mode of plashing hedges herein described, consisting, essentially, in bending the canes down nearly or quite parallel to each other in line with the fence, and securing them in that position by a bar or bars, B, to which they are separately fastened or connected by a fastening not a part of the growing hedge, substantially as described.

MICHAEL NEIL.
WESLEY YOUNG.

Witnesses:
JORDAN THOMAS,
GEO. M. YOUNG.